United States Patent [19]

Maine

[11] 3,790,401
[45] Feb. 5, 1974

[54] METHOD FOR THE PREPARATION OF COMPOSITE WOOD-POLYMER PRODUCT

[75] Inventor: Jack Maine, Saginaw, Mich.

[73] Assignee: C. W. Maine & Sons, Inc., Saginaw, Mich.

[22] Filed: Jan. 27, 1971

[21] Appl. No.: 110,272

Related U.S. Application Data

[63] Continuation-in-part of Ser. No. 714,066, March 18, 1968, Pat. No. 3,560,255.

[52] U.S. Cl............. 117/59, 117/57, 117/61, 117/116, 117/119, 117/148, 117/161 UF, 117/161 UH
[51] Int. Cl....... B44d 1/28, B44d 1/092, B27k 3/34
[58] Field of Search 117/148, 57, 62.2, 119, 161 UH, 117/161 UF, 59, 61, 102 R; 260/669 P, 93.5, 17.4 R; 106/203

[56] References Cited
UNITED STATES PATENTS

| | | | |
|---|---|---|---|
| 3,560,255 | 2/1971 | Maine | 117/148 |
| 3,607,355 | 9/1971 | Loeb | 117/148 |
| 3,077,419 | 2/1963 | Kenaga | 117/59 |
| 2,591,768 | 4/1952 | Austin | 117/59 |
| 3,076,738 | 2/1963 | Uschmann | 117/59 X |
| 3,077,417 | 2/1963 | Kenaga | 117/59 |
| 3,401,213 | 9/1968 | Trementozzi et al. | 117/148 X |

FOREIGN PATENTS OR APPLICATIONS 857,353  12/1970  Canada............................. 106/203

Primary Examiner—Alfred L. Leavitt
Assistant Examiner—Thomas E. Bokan
Attorney, Agent, or Firm—Learman & McCulloch

[57] ABSTRACT

A method of manufacturing a composite wood-polymer product comprising wood permeated throughout with a polymer of tert-butylstyrene, and the resultant product is described. The composite product is characterized by polymer in the cells or pores of wood between adjacent fibers and in the cell walls of the fibers. The product is tough, durable, extremely moisture resistant, and has the appearance of the original wood.

8 Claims, No Drawings

METHOD FOR THE PREPARATION OF COMPOSITE WOOD-POLYMER PRODUCT

This application is an improvement over and a continuation-in-part of my copending application, Ser. No. 714,066, filed Mar. 18, 1968, now U.S. Pat. No. 3,560,255.

The invention disclosed herein relates to the manufacture of a composite wood-polymer product especially adapted for use in the manufacture of furniture, flooring, paneling, or the like and more particularly to the manufacture of such a product wherein the original wood, including its fibers, is thoroughly impregnated with a thermoplastic polymer of tert-butylstyrene to provide a composite product of superior quality for use in the manufacture of wood furniture, flooring, paneling, and the like.

It is known that wood, such as lumber and sheets of veneer, can be impregnated with a plastic material to provide a tough, protective surface on the wood. It also is known that wood particles, such as slivers, chips, and shavings, can be coated with a plastic material and compressed into structural shapes.

Reference is made to the disclosure of the aforesaid copending application Ser. No. 714,066, which teaches the impregnation of wood with a polymer of tertiary butylstyrene, providing a product having a hard Formica-like surface as a result of the polymer contained within the wood. Although wood products made in accordance with the aforesaid disclosure are very satisfactory for many applications, an analysis of the products indicate that the polymer contained in the wood is primarily in the spaces between adjacent wood fibers. The fibers themselves are substantially free of polymer content.

It has also been recognized that a sandwich-type product composed of a core of compressed wood particles between two sheets of wood could be made for use in the manufacture of paneling and flooring. However, attempts to manufacture such a product in commercial quantities from plastic-impregnated component parts have been relatively unsuccessful because of the difficulty in obtaining a truly permanent bond between the core and the sheets due to the adverse effects of changes in temperature and humidity on commercially available adhesives.

The present invention is directed to an improved method for impregnation of wood, including lumber, veneers, and particles with a thermoplastic polymer. When utilizing the improved method the fibers themselves, as well as the pores of the wood, contain the polymer, thereby resulting in a composite wood-plastic product which is extremely moisture resistant, hard, durable, dense, and strong. The present invention also contemplates the manufacture of sandwich-type products including polymer impregnated chips or particles sandwiched between polymer impregnated sheets of lumber and wherein the component parts of such products are fused to one another by the polymer itself.

According to the primary embodiment of the present invention wood, such as pieces of lumber or sheets of veneer, is immersed in a mixture of the impregnating monomer and a volatile carrier which is capable of penetrating and swelling the wood fibers. Inasmuch as the monomer-carrier mixture contains the monomer, the penetration of the fibers by the carrier results in penetration of the wood fibers by the monomer as well. The wood is removed from the impregnating monomer and the monomer polymerized or cured in the presence of heat. The resulting product is one in which the wood pores or cells, as well as the fibers themselves, contain the polymer.

The process according to the present invention can be modified in various ways. For example, it may be desirable to first subject the wood being treated to a vacuum to remove air from the cells or pores of the wood prior to immersing the wood in the monomer-carrier mixture. Moreover while the wood is immersed it may be desirable to subject the wood and monomer-carrier mixture to pressure to enhance the impregnation of the pores of the wood and the wood fibers with the carrier-monomer mixture. In instances where a relatively deep and thorough impregnation of monomer into the wood pores and fibers is desirable, it may be advantageous to repeat the immersion step. Thus, after the wood article being treated is subject to vacuum treatment and the first immersion into the monomer-carrier mixture under pressure, it may be desirable to drain the excess mixture from the wood, again subject the wood to vacuum to selectively remove the volatile carrier from the cells, followed by a second immersion of the wood into either the monomer-carrier mixture or impregnating monomer. After such treatment the wood is removed from the impregnating material, whether it be monomer or monomer-carrier mixture, and the monomer polymerized or cured in the presence of heat. The essential feature of the invention is the impregnation of the wood being treated with a mixture of monomer and carrier. The carrier must have a volatility and molecular character which will permit the carrier to penetrate and swell the wood fibers. This penetration and swelling of the wood fibers by the carrier deposits monomer within the wood fibers. Since the carrier is volatile relative to the monomer, it will be selectively volatilized, leaving the monomer in the wood fibers which is eventually polymerized in situ. Operable solvents include methylene chloride, alcohols such as ethyl alcohol, propyl alcohol, amyl alcohol, and mixtures thereof with methyl isopropyl ketone, methyl ethyl ketone, acetone and the like.

Products produced by the foregoing procedure are not necessarily impregnated throughout their thickness. The depth of impregnation depends on the thickness of the wood sample, the wood itself, and other factors such as the time of the impregnating cycle, etc., but in all cases the wood is impregnated inwardly from its outer surfaces.

Impregnated wood produced according to the foregoing procedures normally requires no planing; it is necessary only to sand the surface lightly to clean it of any excess monomer and to produce a smooth, polished surface. Inasmuch as little, if any, wood is lost during the cleaning and polishing operation, commercially available veneers as thin as 1/28th inch can be impregnated successfully. As a consequence, such veneers, as well as thicker sheets of wood, can be utilized in sandwich-type flooring or paneling structures of the kind wherein a core of compressed wood chips or particles is sandwiched between two sheets of lumber.

The construction of sandwich-type structures is facilitated greatly by inroducing tert-butylstyrene in accordance with the presently described method into the core and the core-flanking sheets. The use of tert-butylstyrene results in so little, if any, monomer loss from the surface of the wood sheets and from the surface of the compressed core that the core and the flanking sheets can be assembled and cured simultaneously with the result that the sheets and the core fuse. In the production of a sandwich-type structure the wood chips or particles may be soaked until saturated in the monomer and then compressed in a mold to form a core of the desired thickness and density. The molded core then may be sandwiched between two uncured sheets impregnated in the manner previously described and the entire structure cured in the presence of heat.

Sheets of wood impregnated in the manner hereinbefore referred to exhibit a surprising enlargement or growth in a direction transverse to the grain. That is, a square sheet of veneer having identical dimensions both longitudinally and transversely of the grain prior to impregnation, retains its longitudinal dimension throughout the impregnating and curing operations, but increases its transverse dimensions during the impregnating operation. Some, but not all, of this increase may be lost during the curing operation. The increase in size of the impregnated sheet indicates that the monomer not only occupies the cells or pores of the wood, but indicates that the walls of the cells themselves have been impregnated. That is, the wood fibers have been impregnated.

According to this invention an article of wood is impregnated with tert-butylstyrene and the impregnated wood product heated in a circulating air oven to elevated termperatures sufficiently high to effect polymerization of the monomer to a solid thermoplastic product. Utilizing a method as described allows for the use of polymerization temperatures as high as 220° F. without risking charring of the wood, thus decreasing the polymerization time.

The term "tert-butylstyrene" as used herein is intended to encompass all isomers and mixtures thereof.

It is customary to utilize in conjunction with the tert-butylstyrene a polymerization catalyst which, under the impetus of heat, will initiate the polymerization of the monomer to a thermoplastic product. Illustrative of suitable catalysts are the "azo"-type catalysts such as $\alpha,\alpha'$-azobisisobutyronitrile; $\alpha,\alpha'$-azodicyclohexylcarbonitrile; $\alpha,\alpha'$-azobis, $\alpha,\alpha$-dimethylgleronitrile; and the like. Other suitable polymerization catalysts for this monomer include other azo-type catalysts, are described in Sorenson and Campbell, *Preparative Methods of Organic Chemistry*, 1961, Interscience Publishing Co., the disclosure of which is incorporated herein by reference. Other polymerization catalysts, such as zenzol peroxide, dicumylperoxide, and the like can be used in lieu of the azo-type catalysts. The usual additives, such as colorants, anti-oxidants, and the like, can be added to the monomer prior to the impregnation of the wood surface.

The temperature at which the heating or curing cycle is conducted can be varied as desired. As an illustration, temperatures as high as about 220° F. can be used in order to decrease the time of the curing cycle. As a general rule, temperatures between about 150° F. and about 220° F. are used.

During the heating or curing of the impregnated articles the latter are supported on racks in a conventional air circulating oven and air is circulated through the oven so as to cause the air to pass all around the articles to dissipate excess heat.

The following examples further illustrate the present invention, but are not intended to limit the scope thereof:

EXAMPLE I

A sheet of red oak veneer initially 25 inches wide, 30 ¼ inches long, and one twenty-eighth inch thick, was placed in a vacuum chamber and subjected to a vacuum of about 26 inches mercury for about three hours so as to expel air from the pores or cells of the sample. While maintaining the vacuum the sample was immersed in a fluid comprising a mixture of equal parts, by weight, of paint grade alcohol (approximately 95 percent ethyl alcohol), methyl ethyl ketone, and the impregnating mixture. The impregnating mixture comprised 89 wt. percent tert-butylstyrene, 10 wt. percent glycol, and 1 wt. percent azo catalyst. Following immersion of the sample, the chamber was pressurized to about 105 p.s.i. for a period of about 24 hours, whereupon the pressure was relieved and the chamber drained. The chamber then was subjected to a vacuum of about 26 inches mercury for about one-half hour to extract the alcohol and methyl ethyl ketone from the wood pores while retaining substantially all of the tert-butylstyrene and catalyst within the wood fibers. While maintaining the vacuum, the impregnating mixture as described above was introduced to the chamber to a depth sufficient to immerse the sample, following which the chamber was pressurized to about 105 p.s.i. for about 16 hours. The pressure thereupon was relieved and the chamber subjected to a vacuum of about 26 inches mercury for a period of about 8 hours while the sample remained immersed in the impregnating mixture for the purpose of removing any residual methyl ethyl ketone and alcohol from the sample. The chamber then was drained and the sample was placed on a rack and cured in a circulating air oven at a temperature of about 220° F. for about two hours until the tert-butylstyrene was polymerized. The resulting product then was measured and was found to have a length of 30 ¼ inches, a width of 25 9/16 inches, and a thickness of slightly more than one twenty-eighth inch. Light sanding of the surfaces of the sample to remove excess polymer restored the sample to its original thickness of one twenty-eighth inch.

Tert-butylstyrene itself will not penetrate the fibers of wood, but alcohol and methyl ethyl ketone will, thereby effecting swelling of the fibers and carrying of the tert-butylstyrene into the fibers. The presence of methyl ethyl ketone facilitates the penetration and extraction of alcohol from the fibers. Once the tert-butylstyrene penetrates the fibers via the cell walls, some portion will remain following the extraction of the carrier fluid. Upon the polymerization of the monomer, therefore, it is virtually impossible for moisture to enter the fibers, thereby virtually immunizing the wood-polymer product from warping, checking and cracking. The fire retardment of the treated sample is much greater than that of the uncured sample.

The following table sets forth original width and thickness dimensions of other uniform samples and their cured width dimensions, all of such samples being produced according to the procedures specified in Example I and all of the samples retaining their original lengths and thicknesses following light surface sanding:

TABLE I

| Sample | Original Size (Width and Thickness) | Cured Size (Width only) |
| --- | --- | --- |
| Walnut | 25"×1/28" | 25-9/32" |
| Walnut | 28½"×1/28" | 28-13/16" |
| Hard Maple | 25"×1/28" | 25-19/32" |
| Brasswood | 25"×1/16" | 25-11/16" |
| Birch | 25"×1/28" | 25-13/16" |

EXAMPLE II

A sheet of walnut veneer 25 inches wide, 34 inches long and one twenty-eighth inch thick was immersed in a fluid comprising 8.3 wt. percent paint grade alcohol (95 percent ethyl alcohol) and 58.3 wt. percent methylene chloride and 33.4 wt. percent impregnating mixture. The impregnating mixture comprised 89 wt. percent tert-butylstyrene, 10 wt. percent glycol and 1 wt. percent azo catalyst, as in Example I. The sample was permitted to soak in the fluid at atmospheric pressure for about 18 hours, a period of time sufficient to produce maximum swelling of the sample. When the sample has absorbed sufficient fluid to reach its maximum degree of swelling, the sample was removed from the fluid and promptly immersed in the aforementioned impregnating mixture and permitted to soak at atmospheric pressure. During this period the methylene chloride and alcohol contained in the sample escaped resulting in some shrinkage or loss of swelling of the sample, but after about 18 hours the shrinkage stopped and the size of the sample stabilized. The width of the stabilized sample was greater than that of the original sample. The sample then was removed from the impregnating mixture and cured in an air-circulating oven at a temperature of about 220° F. for about 2 hours.

The surfaces of the cured product were lightly sanded to remove excess polymer and restore the sample to its original thickness of one twenty-eighth inch. The length of the cured sample remained 34 inches, but its width was 25 11/32 inches, or a gain of eleven thirty-seconds inch over its original width.

The cured product was one in which both the pores and the fibers contained the polymer as in the case of the sample described in Example I.

The following table sets forth width and thickness dimensions of other wood samples of uniform length, all of such samples being produced according to the procedure of Example II and all of such samples retaining their original lengths and thicknesses following light surface sanding:

TABLE II

| Sample | Original Size (Width and Thickness) | Cured Size (Width Only) |
| --- | --- | --- |
| Hard Maple | 28"×1/26" | 28-11/16" |
| Oak | 10"×1/8" | 10-9/32" |
| Oak | 9-¾"×⅛" | 9-⅞" |
| Basswood | 28"×1/32" | 28 ⅞" |
| Walnut | 28"×1/28" | 28 11/32" |
| Birch | 28"×1/26" | 28 13/16" |

The first and second soaking periods referred to above vary between 14 and 24 hours for different woods and different thicknesses so as to enable the different woods to reach their maximum swollen sizes and their stabilized sizes.

The samples produced according to Example II possessed the same characteristics of resistance to warping, checking, cracking and fire retardment as the samples produced according to Example I.

EXAMPLE III

The wood samples referred to in Tables I and II first may be subjected to a partial vacuum in accordance with the first step of Example I to expel air from the pores of the samples, following which the samples may be immersed and soaked at atmospheric pressure in accordance with the soaking steps of Example II. Products thus produced correspond substantially to those produced by the process of Example II, thereby indicating that it is not essential to first expelling air from the samples before impregnating with the carrier-monomer mixture.

EXAMPLE IV

Wood particles such as chips, slivers, shavings and sawdust of a variety of woods such as oak, maple, basswood, birch and walnut were immersed in an impregnating fluid composed of 89 wt. percent tert-butylstyrene, 10 wt. percent glycol and 1 wt. percent azo catalyst and soaked at atmospheric pressure for a period of between 1 and 2 hours to saturate the particles. The saturated particles then were compressed in a mold at pressures ranging from 80–500 p.s.i. to produce a compressed body having the desired density and thickness. The greater the pressure, of course, the greater the density. During the compression of the saturated particles excess fluid was permitted to run off. The compressed body then was sandwiched between two uncured sheets of veneer produced according to Example I, II, or III. The sandwich assembly then was placed in the air circulating oven referred to above and cured at a temperature between 150° F. and 220° F. for a period of between 1 and 2 hours to polymerize the tert-butylstyrne monomer. The outer surfaces of the cured sandwich assembly were lightly sanded to remove excess polymer. The resulting product was a sandwich having an inner core of polymerized particles fused to one another and to the two outer layers of polymer impregnated wood.

The sandwich product is particularly useful as paneling and parquet flooring and exhibits a high degree of imperviousness to moisture, warping, checking and cracking. The bond of the outer layers to the inner core is particularly good and is no more affected by moisture than are the outer layers themselves.

EXAMPLE V

Wood particles such as those referred to in Example IV were saturated in the impregnating fluid and compressed as described in that Example. The compressed body then was cured in the air circulating oven at a temperature of between 150° F. and 200° F. for a period of time between one-half and 2 hours. The curing temperature and time depend upon the thickness and density of the body and, in general, the less the thickness and density, the lower the temperature and the shorter the time required to effect polymerization of the impregnating monomer. The cured body was then sandwiched between two cured sheets of wood impregnated and cured according to Example I, II, or III to which a commercially available epoxy adhesive had been applied. The assembly was maintained under such pressure and for a sufficient length of time to permit the adhesive to set. The resulting product was a sandwich similar to that produced according to Example IV, with the exception that the component parts of the sandwich were maintained assembled by the adhesive, rather than by fusion.

The product produced according to this example is not as resistant to moisture as is the product produced according to Example IV inasmuch as no known adhesive is as moisture proof as polymerized tert-butylstyrene. In some installations, however, moisture is not a problem so that adhesive functions well and has the advantage of being less expensive than the monomer.

It should be appreciated that the present invention is not to be construed as being limited by the illustrative embodiments. It is possible to produce still other embodiments without departing from the inventive concept herein disclosed. For example, it is possible to utilize the tert-butylstyrene monomer in admixture with other monomers such as mono-chlorostyrene, methyl methacrylate, and the like, provided the tert-butylstyrene is present in an amount of at least about 50 percent of the total monomer employed. Additionally, the methylene chloride, alcohol, and methylethyl ketone carriers of the examples can be replaced with other solvents such as mixtures of alcohol, ethyl acetate, and glycol or other mixtures of solvents which possess a high volatility and which will impregnate and swell the wood fibers. Such embodiments are within the ability of one skilled in the art.

I claim:

1. The method of treating wood comprising the steps of impregnating the wood article being treated with a mixture comprising tert-butylstyrene monomer and a carrier for said monomer; removing excess carrier and monomer from said wood article and thereafter polymerizing said monomer contained in said wood, said carrier having a higher volatility than said monomer and a molecular character whereby said carrier penetrates and swells said wood.

2. The method of claim 1 wherein said wood is immersed in said monomer-carrier mixture during said impregnation.

3. The method of claim 2 wherein said wood article is subjected to vacuum treatment to remove air contained in said wood prior to said immersion step.

4. The method of claim 2 wherein the wood article after removing said excess carrier and monomer is immersed in tert-butylstyrene monomer before polymerizing said monomer contained in said wood.

5. The method of claim 1 wherein the carrier is methylene chloride.

6. The method of claim 1 wherein the carrier is a mixture of alcohol and methylethyl ketone.

7. The method of claim 3 wherein the carrier is a mixture of methylene chloride and alcohol.

8. The method of claim 4 wherein the wood article is veneer sheet.

* * * * *